United States Patent Office 3,020,158
Patented Feb. 6, 1962

3,020,158
PROCESS OF AMMONIATING FEED
Walter R. Fetzer, Clinton, Iowa, assignor to Standard Brands Incorporated, New York, N.Y., a corporation of Delaware
No Drawing. Filed Nov. 25, 1957, Ser. No. 698,382
8 Claims. (Cl. 99—2)

This invention relates to a new sweetened feed product for ruminants and a process for producing the same.

Sweetened feeds for ruminants, such as dairy and beef animals, have been manufactured for many years by mixing such sugar-bearing materials as blackstrap molasses or corn sugar molasses (hydrol) with various by-products of the Corn Wet Milling Industry, such as corn gluten meal, corn gluten feed, and corn oil meal, and with other cereal by-products. These by-products furnish protein to the sweetened feed in such variable proportions as may be dictated by the judgment of the feed manufacturer and by the requirements of his customers. The sugar materials contribute sugars in proportions deemed advantageous in the feeding of the ruminants.

A serious problem long recognized in the compounding of this class of feeds resides in the fact that the two above-mentioned molasses products are inherently sticky in the concentrated form in which they are customarily added to the other ingredients of the mixture, and this condition persists in the final product when dehydrated down to commercial standards of moisture content, such, for example, as about 2.5 to 3.5% moisture. As a consequence, such sweetened feeds tend to cake, or form lumps, and under pressure, when stacked in bags or otherwise, tend to become dense, hard masses which sometimes require chipping and grinding to re-condition them for normal use.

Because of the stickiness and caking tendencies of such feeds, some manufacturers have circumvented the problem to some extent at least, but at added cost, by forming the feed into compressed pellets that have a lessened tendency to cake or compact together.

The present invention provides a new process for producing a nitrogen-enriched sweetened feed which, under most conditions of ambient temperatures and humidity and other conditions encountered in the handling of the product, has a negligible tendency to cake or compact. And, additionally, the product makes available to the cattle feed industry a sweetened feed containing the several advantageous characteristics of the ammoniated sugar liquors disclosed in my co-pending application, Serial No. 375,552, filed August 20, 1953, since abandoned, and my co-pending application Serial No. 600,173, filed July 26, 1956.

I have discovered that a partially ammoniated sugar liquor upon being mixed with feed materials of the class mentioned above and dehydrated at an elevated temperature in accordance with this invention, unexpectedly yields a sweetened feed, which is dry and pulverulent in character, and wholly or practically free of the caking tendencies of the sweetened feeds heretofore known.

The general object of the invention is to produce a feed for ruminants, utilizing, for the sake of economy, materials otherwise having low market value and synthetically raising the protein equivalent of one of the components of the mixture and providing a sweetened feed in attractive, palatable, and pulverulent bulk form.

A further object of the invention is to combine the ammoniation of sugar-bearing materials with a feed mixing and drying process, with total advantages not heretofore perceived or predictable in the industry.

Another object of this invention is to provide a new sweetened feed which is markedly less sticky than comparable feedstuffs heretofore sweetened with sugar-bearing liquid materials, and which has little or no tendency to cake or lump when exposed to ordinary atmospheric humidity conditions.

In the practice of the present invention, a sugar-bearing sirup is reacted with ammonia under conditions somewhat similar to those set forth in my co-pending patent application Serial No. 375,552, filed August 20, 1953, since abandoned, and my co-pending application Serial No. 600,173, filed July 26, 1956. However, instead of continuing the heating cycle until the ammonia has fully reacted with the sugars, the cycle is interrupted and a dry solid feedstuff ingredient is admixed with the partially reacted syrup, after which the mixture is dried with heat to the final desired moisture content. The partially reacted ammonia-syrup mixture may be cooled below the reaction temperature before or during the mixing with the solid ingredients, and the mixture thereafter reheated to complete the reaction and to dry the mixture to a desired final moisture content. This intermediate cooling step is optional in the practice of the invention.

For sugar-bearing materials to be ammoniated I prefer, for purposes of economy, to use those of low monetary value, such as the materials enumerated in my aforesaid co-pending patent application, such as citrus molasses, a by-product of the citrus juice industry; hydrol, a by-product of the dextrose or corn sugar refining industry; crude corn sugar; blackstrap molasses; beet sugar molasses; and wood-sugar-containing liquors. However, if the economics involved warrant it, other sugar-bearing materials may be employed.

The ammoniation of the sugar-bearing material in accordance with this invention involves certain features not found in prior ammoniation procedures. First, the ammonia is added under such conditions of rate, temperature, and amount that it readily reacts with the sugar in chemical combination, thereby avoiding loss of ammonia to the atmosphere. Secondly, an acidic material is added at such a rate and in such manner that the reaction mixture is maintained within the pH limits of 4.0 to 7.5. This condition may be achieved by adding the ammonia as anhydrous, aqueous, or as carbonate, together with small increments of acid, such as hydrochloric, sulfuric, or phosphoric; or adding a part of the required ammonia as a salt, such as ammonium chloride, sulfate or phosphate, singly or in combination, and adding the remainder of the ammonia as anhydrous, aqueous, or as carbonate. If, as in some processes, the pH should fall much below pH 4.0, acid reversion or repolymerization of the sugars is initiated, whereby the reducing sugar content would be decreased more than is desired. If, on the other hand, the pH is permitted to rise above about 7.5, alkaline degradation to sugar acids sets in, with an attendant loss of sugar substance. Thirdly, while the ammoniation reaction is still proceeding at an elevated temperature, the sugar-bearing liquor is mixed with a solid feed and the mixture is then dried with heat to a conventional moisture content and cooled. During the drying-with-heat step, the applied heat is utilized to carry the ammoniation on to an extent desired, while carefully avoiding certain undesirable results.

It is important to limit heating of the sugar-ammonia reaction mixture in the liquid state before mixing with the feed solids, so as to make allowance for further reaction to take place as a result of the heat used in drying the final product after mixing the sirup with the feedstuff. Failure to make this allowance would result in a final product having an objectionably dark color, disagreeable odor, and burnt flavor.

It appears that the length of the period during which the sirup, as a body of liquid, is subject to reaction with ammonia at an elevated temperature, and the length of the subsequent period when the mixture of feed and sugar liquid is subject to heat in the drier are each susceptible of some variation. The size and nature of the equipment being used, together with localized and average temperature in such equipment during each period, direct and importantly affect the speed of the chemical reactions. It is the total combined effect of both heating periods which must be looked to and regulated in connection with the broad purpose of this invention. That is, the total chemical reactions of the ammonia on the sugar-bearing liquid should be completed and terminated by cooling substantially below the preferred or effective reaction temperatures before the final feed product becomes objectionably darkened or acquires a severe burnt odor, or before there occurs unnecessary loss of reducing sugars. Were the reaction not stopped by cooling before this undue darkening occurs, the finished feedstuff would be a muddy coffee color and have a pungent odor, characteristic of "burnt feed", which usually has decreased nutritional value.

The sugar-containing starting material conveniently should be in liquid or sirup state and preferably at a high density, i.e., low moisture content, for economy in processing, handling, and shipping.

A feature of primary importance in my process is that the ammoniation of the sirup be conducted within a carefully controlled pH range, lower than has characterized other but unrelated ammoniation processes. Excessive concentration of ammonia and excessive total use of ammonia is avoided for accuracy of control, maintenance of optimum conditions, improvement of the desired yield, and economy.

While the chemical mechanism of the process is not definitely known, it is believed that the ammonia first reacts with the carbonyl group of the sugar to produce an aldehyde ammonia complex and that through subsequent heating, at controlled pH, the ammonia group passes on down the carbon chain to the next carbon atom, forming an amino sugar. In the case of dextrose, this could be a glucosamine, 2-desoxy-2 aminoglucose. The careful control of heating conditions and pH in accordance with the teachings of this specification, permits this reaction to proceed with a minimum destruction of these valuable end-products.

The relatively small amount of color which develops in the sirup before the sirup is added to the feed serves clearly to indicate visually one difference between my process and other known contemporary processes involving the reaction between ammonia and sugar substances.

The addition of the ammonia and the acidulating agent is so regulated as to maintain the sirup in the pH range of 4.0 to 7.5, preferably not over 7.0, and this pH control appears to exercise a desired definite control over the course of the chemical reactions, particularly in the reaction of the ammonia with the dextrose molecules.

In accordance with my invention the ammonia is preferably added continuously to the starting material and in such small increments simultaneously with the acidic material that the pH is not allowed to exceed 7.5, for at a pH much in excess thereof alkaline degradation of the reducing sugars would become rapid. Since the end-products of the chemical reactions in my process (the amino sugars), have a neutral or slightly alkaline reaction, I find that by controlling the pH by the addition of acid, such as hydrochloric acid, thereby forming the hydrochlorides, when hydrochloric acid is used, this action prevents the pH from increasing into a higher pH range where alkaline degradation could become an important factor. The formation of the hydrochlorides of the amines when hydrochloric acid has been used, preserves the amino sugars which have been formed. An ammonium salt, such as ammonium chloride, phosphate or sulfate, may be used for this purpose and whether acid or an ammonium salt is used depends upon the economics of the chemicals, convenience, or the cost of the equipment involved.

The process, furthermore, consists in the addition of ammonia and acidic material to sugar-bearing materials under conditions of temperature and pH favorable to the production and stability of what is thought to be, in the case of dextrose-rich materials, glucosamine. Such a process results in a maximum of final nitrogen-bearing reducing sugars and a minimum of sugar degradation in the ammoniated product.

I prefer to carry out the ammoniation of the sugar liquor in a reaction vessel or kettle, which is closed primarily to prevent the loss of ammonia gas. Such a vessel may be a jacketed kettle equipped with an agitator. The ammonia system may consist of an ammonia cylinder on a dial type weighing scale, connected through a flexible hose to an iron pipe system leading to the reaction kettle. A shut-off valve would be a part of such a cylinder assembly; and another shut-off valve would be at the kettle. The pipe system in the kettle should consist of a pipe leading to a circular ring in the bottom of the kettle and provided with a large number of small holes. There should be provided one additional small hole in the top of the pipe inside the inner surface of the kettle but above the liquid level.

The acid or ammonium salt should be added gradually in any appropriate manner which will avoid localized over-acidulation and counter-act excessive alkalinity.

In performing the process of this invention, any one of several sugar-containing sirups may be used, but for purposes of economy I prefer to start with a relatively low-cost sugar product such as corn sugar molasses (hydrol), citrus molasses, cane or beet molasses, or wood sugar containing liquors. The solid feedstuff with which the ammoniated sirup may advantageously be combined may, for example, be corn oil meal, corn gluten meal, meals derived from other cereal grains and from leguminous materials such as soybeans, alfalfa and clovers. Citrus meal also may be utilized and usually is available where citrus molasses is produced and therefore it is generally economically advantageous to combine such meal with the ammoniated citrus molasses.

The ratio between the ammonia and the acidic material needed to maintain the required pH range will be affected by the buffer power of the sirup and, therefore, alterations must be made where necessary to compensate for differences in the buffering capacity of the sirups being treated.

In operation, the sugar-bearing material is placed in the reaction kettle described above, and heated by any convenient means, such as steam on the jacket, to about 140° F. to 220° F.

After the chemicals have been added as above described, the sirup is held within the above mentioned reaction temperature range until the chemical reactions have proceeded to the extent desired, which may be conveniently determined by the "free" ammonia residual in the sirup.

The ratio between the combined and the "free" $NH_3$ in the final product is easily controlled; by increasing either the reaction time or the temperature or both, the amount of "free" $NH_3$ remaining will be decreased. The reaction time and temperature may be varied consistently with the percentage of ammonia employed and with the extent of ammoniation desired.

The term "free" ammonia as used in this patent specification refers to ammonia which can be liberated by magnesium hydroxide from certain chemical combinations, and which can be measured according to the procedure described in "Technical Methods of Analysis," by R. C. Griffin, McGraw-Hill Book Co., Inc., second edition, 1927, page 91. This analytical procedure is thought to measure the ammonia which is combined with the carbonyl group as the aldehyde ammonia addition complex, as distinguished from the ammonia which is combined with the sugar in the form of a sugar amine. This "free" ammonia should not be confused with uncombined ammonia which will vaporize spontaneously and be readily detectable by its odor. As a matter of fact, the products made in accordance with this invention have no odor of ammonia whatever, but rather have a very pleasant and desirable toasted odor.

As the ammoniation reaction is to be completed in the drier to the extent desired while the sirup and feedstuff or meal are simultaneously being heated and dehydrated, the total reaction time is properly to be proportioned between these two steps. The retention time in the drier will depend on the type of drier equipment available and the manner in which such available equipment is advantageously operated.

In the examples which follow, the sugar-bearing liquid, in this case hydrol, is treated with ammonia in an amount equal to 5% of the dry substance content of the hydrol. Several examples are given showing the effect of various reaction times. The products of certain of several of these reactions were then compounded into sweetened feeds in accordance with the process of this invention and dried.

EXAMPLES

*Step A.—Typical conditions for partial ammoniation of hydrol*

One thousand pounds of hydrol at 43.3° Bé. of 73.5% dry substance, contains 735 pounds of dry substance. For a 5% level of ammoniation, 36.75 pounds of total ammonia ($NH_3$) is required. Ammonium chloride was selected as the acidic constituent to control the pH. For suitable control of the pH in these examples, 52.1 pounds of ammonium chloride was employed, which contributed 45% of the total ammonia required, i.e., 16.55 pounds of $NH_3$. The balance of the ammonia, 55% of the total, or 20.2 pounds, was added as anhydrous ammonia. The reaction mixtures were heated at 200° F. for various lengths of time.

*Step B.—Typical conditions for mixing partially ammoniated hydrol into a solid feed*

The liquid products of these several experiments were subsequently mixed with solid feed ingredients to produce an ammoniated sweetened feed. In each of these cases, the following ingredients were combined:

7.5 pounds Corn Gluten Meal at 10% moisture, containing 41% crude protein;
33.7 pounds Corn Oil Meal containing 10% moisture and 21% Crude protein;
58.8 pounds partially ammoniated hydrol, containing about 30% moisture, and about 26% crude protein equivalent.

These wet mixtures were then dried in the customary manner for feedstuffs; namely, to 5% and to 1% residual moisture. The analyses of the partially ammoniated hydrols and their respective dried feed products containing them are shown in the tables below. Terms used in these tables are defined as follows:

Crude protein equivalent—N x 6.25.
"Free" $NH_3$—Determined as described in "Technical Methods of Analysis" by R. C. Griffin, McGraw-Hill Book Co., Inc., Second Edition, 1927, page 91.
pH of sirups—Glass electrode value obtained on the sirup at full concentration.
pH of feeds—Glass electrode value of an extract of 10 g. of feed diluted to 100 ml. with distilled water.
Color—The Lovibond value, caramel series 52, in a one-inch cell employing a solution obtained from 1 g. of material diluted to 1,000 ml. with distilled water.
D.E.—Reducing sugars calculated as dextrose and expressed as a percentage of the total dry-substance.

ANALYSES OF CONTROL HYDROL AND OF PARTIALLY AMMONIATED HYDROLS AND OF SWEETENED FEEDS CONTAINING THEM

|  | Control Hydrol | Liquid Ammoniated Hydrols Time Held at 200° F. in minutes | | | | |
|---|---|---|---|---|---|---|
|  |  | 37 | 60 | 120 | 180 | 240 |
| Ammonia Added, Percent of D.S. | 0.0 | 5.0 | 5.0 | 5.0 | 5.0 | 5.0 |
| Dry substance, percent | 73.6 | 71.81 | 71.64 | 70.46 | 69.92 | 68.52 |
| D.E. | 73.2 | 55.9 | 55.2 | 51.8 | 46.5 | 45.0 |
| "Crude Protein Equivalent" D.B. | 0.2 | 25.5 | 25.8 | 26.1 | 25.5 | 25.8 |
| "Free" Ammonia D.B. | 0.0 | 2.9 | 2.8 | 2.4 | 2.1 | 1.9 |
| "Crude Protein Equivalent" of the "Free" Ammonia D.B. | 0.0 | 14.94 | 14.92 | 12.36 | 10.82 | 9.79 |
| pH | 4.2 | 7.4 | 7.1 | 6.6 | 6.1 | 5.3 |
| Color | 0.2 | 1.5 | 2.0 | 3.8 | 6.2 | 7.0 |

Sweetened Feeds Made with Above Hydrols and Dried to 5% Moisture Content

| | | | | | | |
|---|---|---|---|---|---|---|
| Moisture | 4.8 | 5.1 | 5.9 | | | 4.3 |
| D.E. | 38.4 | 30.4 | 28.9 | | | 21.7 |
| "Crude Protein Equivalent" D.B. | 13.1 | 26.8 | 26.8 | | | 26.8 |
| "Free" Ammonia D.B. | 0.05 | 1.10 | 1.12 | | | 0.76 |
| "Crude Protein Equivalent" of "Free" Ammonia D.B. | 0.26 | 5.67 | 5.70 | | | 2.91 |
| pH | 4.3 | 6.8 | 6.8 | | | 4.6 |
| Color | 0.1 | 1.2 | 1.5 | | | 4.3 |

Sweetened Feeds Made with Above Hydrols and Dried to 1% Moisture Content

| | | | | | | |
|---|---|---|---|---|---|---|
| Moisture | 1.3 | 1.5 | 1.1 | | | 0.79 |
| D.E. | 36.7 | 24.7 | 21.8 | | | 18.9 |
| "Crude Protein Equivalent" D.B. | 13.0 | 26.8 | 26.8 | | | 26.8 |
| "Free" Ammonia D.B. | 0.05 | 0.45 | 0.29 | | | 0.25 |
| "Crude Protein Equivalent" of "Free" Ammonia D.B. | 0.26 | 2.32 | 1.49 | | | 1.29 |
| pH | 4.4 | 4.5 | 4.2 | | | 3.8 |
| Color | 0.2 | 5.3 | 6.3 | | | 7.3 |

When the mixture of ammoniated molasses and solid feedstuff is being dried in such a conventional commercial feed dryer as a steam heated "Louisville" feed dryer the mixture will dry down to between 2 and 5% moisture content in about one hour, and will not on the average be heated above 212° F., more generally around 200° F. In such time and at such temperature the ammonia reaction does not proceed too far and the product will have a negligible tendency to stick or compact when subsequently cooled to ambient temperatures. Thus even when dried only to 5% moisture it has been found to be satisfactory, whereas the prior known sweetened feeds usually require drying to less than 2.5%. Drying of the product of this invention to as low as 1% is not recommended as being unnnecessary and because of the adverse effect on color and final D.E.

It is found that at least about 1% ammonia based on the dry substance content of the syrup should be used, but that ammonia in excess of 5.5% does not produce further advantages sufficient to warrant the added difficulty of reacting it with the sirup. Ammonia in such proportions when employed in this invention will serve to raise the protein equivalent of the sugar-containing liquid to such economically advantageous levels as 5 to 30%, dry basis.

While sugar-containing sirups have been identified by their common commercial names, other suitable sugar-containing materials may be used.

Ammonia salts and acids other than those mentioned hereinbefore may be employed in this invention whenever suitable.

This application is a continuation-in-part of my application Serial No. 418,751, filed March 25, 1954, now abandoned.

It should be understood that the invention is not limited to the specific details herein mentioned, but embraces variations and modifications within the scope of the appended claims.

Having described my invention, I claim:

1. A two step method of making a nitrogen-enriched sweetened feed for ruminants comprising first reacting ammonia with a sugar-containing sirup at a temperature between 140° and 220° F. utilizing ammonia in amount between 2 and 5.5% of the dry substance weight of the sirup and maintaining the pH of the sirup during the first step between 4.0 and 7.5 pH by the addition of acidic material during the first step thereby increasing the protein equivalent of the sirup between 5 and 30%, secondly, mixing the treated sirup with pulverulent feed solids, drying the mixture thereof while subject to heat at a temperature below 220° F. until the moisture content is reduced to between 1 and 5%, and then terminating the ammoniation reaction by cooling the mixture to a temperature substantially below 140° F.

2. A method of making a nitrogen-enriched sweetened feed for ruminants comprising a first step of treating a sugar-containing sirup with ammonia at a temperature between 140° and 220° F., employing between 2 and 5.5% of ammonia relative to the dry substance weight of the sirup and supplying sufficient acidic material to the sirup to maintain the pH during the first step between about 4.0 and 7.5 pH, thereby increasing the protein equivalent content of the mixture between 5 and 30%, thereafter as a second step mixing the sirup with pulverulent cattle feed solids and drying the mixture to between 2 and 5% moisture content while subject to heat at a temperature not exceeding 220° F., and concluding the heating and drying of the mixture before the color of the sirup in the mixture exceeds about 5.

3. A method of making a nitrogen-enriched feed for ruminants comprising a first step of adding anhydrous ammonia to and dispersing it in a sugar-containing sirup and heating the sirup to a temperature in the range of about 140 to 220° F., adding an acidic material to the mixture in such proportion and manner as to maintain the mixture during said step within a pH range of 4.0 to 7.5, maintaining the sirup subject to such treatment for a period not substantially exceeding one hour while causing the nitrogen content of the mixture resulting from chemical reaction to increase to 5%, thereafter as a second step mixing the sirup with feedstuffs, continuing the reaction between the ammonia and the sirup ingredients while effecting drying of the mixed sirup and feed to about 5% moisture content at temperatures not to exceed 220° F., and thereafter cooling the mixture.

4. A method of making a nitrogen-enriched feed for ruminants comprising adding ammonia to a sugar-containing sirup in the proportion of 2 to 5.5% of the dry substance weight of the sirup, heating the sirup to a temperature in the range of 140° to 220° F., supplying acidic material to the sirup during the heating thereof sufficient to maintain the pH of the sirup between 4.0 and 7.5, continuing the heating of the sirup under the above conditions thereby raising the protein equivalent content thereof to between 5% and 30%, mixing the sirup with pulverulent cattle feed solids and drying the mixture to between 2 and 5% moisture content at an elevated temperature not exceeding 220° F., regulating the total time of the first stage of treatment and the drying treatment to avoid increasing the sirup color above 5, and cooling the mixture to ambient temperatures to terminate the reaction.

5. A method of making a nitrogen-enriched feed for ruminants comprising a first step of adding ammonia to and dispersing it in a sugar-containing sirup and heating the sirup to a temperature in the range of about 140° to 220° F., utilizing ammonia in an amount between 2% and 5.5% of the dry substance weight of the sirup, adding an acidic material to the mixture in such proportion as to maintain the mixture during said step within a pH range of 4.0 to 7.5, maintaining the sirup subject to such treatment until the "free" ammonia has been reduced to less than about 60% of the total added ammonia, and as a second step mixing the ammoniated and partially reacted sirup with pulverulent feed solids, heating and drying the mixture to about 2 to 5% moisture content at temperatures not exceeding 220° F., during which secondary heating period the reaction of the residual free ammonia with the sugar will continue, continuing the reaction at elevated temperature while drying the mixture until the "free" ammonia is reduced to between 40 and 10% of the original added ammonia and the residual reducing sugars are not less than 50% of these originally present, and thereafter cooling the mixture to ambient temperatures to terminate the reaction.

6. A method of making a dry pulverulent non-caking nitrogen-enriched sweetened feed for ruminants comprising a first step of reacting ammonia with a sugar-containing sirup at a temperature between about 140° F. and 220° F. utilizing ammonia in an amount between 2% and 5.5% of the dry substance weight of the sirup and maintaining the pH of the sirup during the first step between 4.0 and 7.5 pH by the addition of acidic material until substantially all of the ammonia has reacted with the sirup into a non-volatile form, and as a second step subsequently mixing the treated sirup with pulverulent feed solids, drying the mixture thereof below 220° F. until the moisture content has been reduced to between 1% and 5%, and terminating the ammoniation reaction by cooling the mixture to substantially below 140° F., and proportioning the time of heating before and after said mixing during which the ammoniation reaction is taking place so as to reduce the "free" ammonia to less than 40% of the total added ammonia, and without reducing the D.E. of the sirup portion by more than 50%.

7. A method of making a dry pulverulent non-caking nitrogen-enriched sweetened feed for ruminants comprising a first step of reacting ammonia with hydrol at a temperature between about 140° F. and 220° F. utilizing ammonia in an amount between 2% and 5.5% of the dry substance weight of the hydrol and maintaining the pH of the hydrol during said step between 4.0 and 7.5 pH by the addition of acidic material until substantially all of the ammonia has reacted with the hydrol into a non-volatile form, and as a second step subsequently mixing the treated hydrol with pulverulent feed solids, drying the mixture thereof below 220° F. until the moisture content has been reduced to between 1% and 5%, and terminating the ammoniation reaction by cooling the mixture to substantially below 140° F., and proportioning the time of heating before and after said mixing during which the ammoniation reaction is taking place so as to reduce the "free" ammonia to less than 40% of the total added ammonia, and without reducing the DE of the hydrol portion by more than 50%.

8. A method of making a dry pulverulent non-caking nitrogen-enriched sweetened feed for ruminants comprising a first step of reacting ammonia with molasses at a temperature between about 140° F. and 220° F. utilizing ammonia in an amount between 2% and 5.5% of the dry substance weight of the molasses and maintaining the pH of the molasses during said step between 4.0 and 7.5 pH by the addition of acidic material until substantially all of the ammonia has reacted with the molasses into a non-volatile form, subsequently mixing the treated molasses with pulverulent feed solids, drying the mixture thereof below 220° F. until the moisture content has been reduced to between 1% and 5%, and terminating the ammoniation reaction by cooling the mixture to substantially below 140° F., and proportioning the time of heating before and after said mixing during which the ammoniation reaction is taking place so as to reduce the "free" ammonia to less than 40% of the total added ammonia, and without reducing the DE of the molasses portion by more than 50%.

References Cited in the file of this patent

UNITED STATES PATENTS

| | | |
|---|---|---|
| 2,197,540 | Klug | Apr. 16, 1940 |
| 2,603,567 | Stiles | July 15, 1952 |